United States Patent [19]

Citta et al.

[11] Patent Number: 5,978,382

[45] Date of Patent: *Nov. 2, 1999

[54] ADAPTIVE RANDOM ACCESS PROTOCOL AND FIXED SEARCH TREE EXPANSION RESOLUTION FOR MULTIPLE STATION NETWORKS

[75] Inventors: Richard W. Citta, Oak Park; Jingsong Xia, Mundelein, both of Ill.

[73] Assignee: Zenith Electronics Corporation, Glenview, Ill.

[*] Notice: This patent is subject to a terminal disclaimer.

[21] Appl. No.: 08/777,217

[22] Filed: Dec. 27, 1996

[51] Int. Cl.$^6$ ........................................................ H04J 3/16
[52] U.S. Cl. ............................ 370/443; 370/458; 370/462
[58] Field of Search .................................... 370/442, 443, 370/444, 447, 347, 348, 321, 322, 461, 458, 462, 468, 522

[56] References Cited

U.S. PATENT DOCUMENTS

| | | | |
|---|---|---|---|
| 4,907,224 | 3/1990 | Scoles et al. | 370/443 |
| 5,303,234 | 4/1994 | Kou | 370/461 |
| 5,384,777 | 1/1995 | Ahmadi et al. | 370/443 |
| 5,590,131 | 12/1996 | Kabatepe | 370/461 |
| 5,615,212 | 3/1997 | Ruszczyk et al. | 370/433 |

*Primary Examiner*—Min Jung

[57] ABSTRACT

A communication system has a plurality of stations which communicate data in a data frame having a plurality of slots, wherein the plurality of slots are new message minislots NMS, expansion minislots EMS, and data slots DS. A master station determines a range parameter R which is based upon a number of slave stations transmitting reservation requests in a data frame. The master station also determines a slot parameter MAP according to a number of reservation requests in a queue waiting to be processed by the master station. The slot parameter MAP defines the new message minislots, the expansion minislots, and the data slots in an upstream data frame. The master station transmits the range parameter R and the slot parameter MAP to a plurality of slave stations. Each slave station independently determines a random transmission parameter RN. Each slave station transmits to the master station (i) a new reservation request in a new message minislot if its random transmission parameter RN corresponds to a new message minislot, (ii) an old reservation request in an expansion minislot if assigned an expansion minislot in the slot parameter MAP, and (iii) data in a data slot if assigned a data slot by the master station.

42 Claims, 5 Drawing Sheets

ADAPTIVE RANDOM ACCESS PROTOCOL AND FIXED SEARCH TREE EXPANSION RESOLUTION FOR MULTIPLE STATION NETWORKS

RELATED APPLICATIONS

The present invention is related to the inventions disclosed in application U.S. Ser. No. 08/734,909 which was filed on Oct. 22, 1996, in application Ser. No. 08/734,908 which was filed on Oct. 22, 1996, and in application Ser. No. 08/777,216 which was filed on Dec. 27, 1996.

TECHNICAL FIELD OF THE INVENTION

The present invention relates to a protocol and fixed search tree expansion procedure for a communication system in which multiple stations share access to a common communication channel.

BACKGROUND OF THE INVENTION

Communication systems typically include a plurality of stations connected to one another over a common communication channel. For example, in a community antenna television (CATV) system, a headend is connected by a cable to a plurality of subscriber stations. The cable supports downstream communication from the headend to the subscriber stations and upstream communication from the subscriber stations to the headend. Data, which is transmitted between the headend and the subscriber stations, is transmitted in data frames. Accordingly, when the headend communicates with a subscriber station, the headend transmits in a down-stream data frame to the subscriber station, and when a subscriber station communicates with the headend, the subscriber station transmits in an upstream data frame to the headend.

In such a CATV system, the headend and the subscriber stations must share the resources of the cable in some manner. For example, downstream and upstream communications are typically allocated to different frequency ranges. In a sub-split allocation, downstream communications are allocated to a frequency range between 54 MHz and 750 MHz and above, while the upstream communications are allocated to a frequency range below 42 MHz. In a mid-split allocation, downstream communications are allocated to a frequency range of 162 MHz and above, while upstream communications are allocated to a frequency range between 5 to 100 MHz. In a high-split allocation, downstream communications are allocated to a frequency range of 234 MHz and above, while upstream communications are allocated to a frequency range between 5 MHz and 174 MHz.

Moreover, the subscriber stations must also share the resources of the cable in some manner. In a time division multiple access (TDMA) CATV system, the subscriber stations typically share the cable by transmitting data during uniquely assigned and non-overlapping time periods. In a frequency division multiple access (FDMA) CATV system, the subscriber stations share the cable by dividing up the available upstream frequency bandwidth into numerous narrow frequency channels and by allocating to each subscriber station its own corresponding narrow frequency band. In a code division multiple access (CDMA) CATV system, the subscriber stations share the cable by multiplying their data messages by corresponding assigned code words and then transmitting the result.

A TDMA system, which assigns each subscriber station to a unique time slot, avoids collisions of data transmitted by the subscriber stations but restricts the amount of data throughput from the subscriber stations to the headend. An FDMA system, which allocates to each subscriber station its own corresponding narrow frequency band, similarly restricts throughput because the number of frequency bands allocated to the subscriber stations is limited. A CDMA system likewise limits throughput over a communication cable because the number of code words which are available to be assigned to subscriber stations is limited.

In order to increase throughput of the data transmitted by the subscriber stations to the headend of a CATV system, it is known to divide the upstream data frame, which supports communication from the subscriber stations to the headend, into a number of minislots and data slots. Those subscriber stations, which have data to transmit to the headend, are required to insert a reservation request in a minislot of the current upstream data frame (i.e., the upstream data frame at discrete time n). This reservation request requests the headend to reserve data slots in a subsequent upstream data frame (e.g., the upstream data frame at discrete times n+1) for use by those subscriber stations.

Because the number of minislots in an upstream data frame utilized by such current systems is limited, contention between subscriber stations for access to the limited number of minislots results in frequent collisions (i.e., contention) between reservation requests. However, it is hoped that at least some reservation requests will be successfully transmitted by subscriber stations to the headend without collision in any given upstream data frame. Therefore, it is generally thought that eventually all subscriber stations will be able to transmit their data to the headend in data slots reserved for that purpose. Yet, because the number of minislots in such systems is limited and fixed, the throughput in such a system is correspondingly limited.

It is also known to increase throughput of the data transmitted by the subscriber stations to the headend of a CATV system by allowing the subscriber stations to contend for the same frequency, time, or code word slots in the upstream data frame and to use a tree algorithm to resolve any resulting collisions. Collisions result when two or more subscriber stations transmit data in the same slot or slots of an upstream data frame. When the headend detects such collisions, the headend initiates a tree algorithm which assigns, for a second layer of contention, a predetermined number of expansion slots in the next upstream data frame for each contention slot in the previous upstream data frame in which there was a collision. In other words, the tree algorithm expands each contention slot in which there was a collision to a predetermined number of expansion slots.

In response to this expansion by the headend, each subscriber station determines whether it transmitted in one of the slots in which there was a collision. Each subscriber station, which determines that it transmitted in a contention slot in which there was a collision, randomly selects in the next upstream data frame one of the expansion slots corresponding to the contention slot of the previous upstream data frame in which it transmitted data. These subscriber stations then re-transmit their data in the corresponding randomly selected expansion slots. If the headend again detects collisions, the tree algorithm assigns, for a third layer of contention, a predetermined number of expansion slots in the next upstream data frame for each slot in the previous upstream data frame in which there was a collision. The contending subscriber stations respond as before. In this way, contention is resolved.

The present invention relates to system which combines the attributes of a protocol which dynamically varies the number of minislots in an upstream data frame, as needed, with the attributes of a tree algorithm for resolving contention when two or more stations collide in the same slot of an upstream data frame. The IEEE is working toward a standard (802.14) regarding such a system.

SUMMARY OF THE INVENTION

In accordance with one aspect of the present invention, a station comprises a receiving means, a transmission parameter generating means, and a transmitting means. The receiving means receives a downstream data frame having a range parameter R and a parameter MAP. The parameter MAP defines a number of new message minislots NMS, a number of expansion minislots EMS, and a number of data slots DS in a next upstream data frame. The transmission parameter generating means generates a transmission parameter RN. The transmission parameter RN is constrained by the range parameter R. The transmitting means (i) transmits a reservation request in a new message minislot of the next upstream data frame if the transmission parameter RN corresponds to a new message minislot, (ii) re-transmits a reservation request in an expansion minislot of the next upstream data frame if the station had transmitted a reservation request in a minislot which was in a previous upstream data frame and which was expanded in the next upstream data frame, and (iii) transmits data in a data slot, if any, reserved to the station.

In accordance with another aspect of the present invention, a station for transmitting data in slots of upstream data messages over a communication medium comprises a receiving means, first and second slot selecting means, and an inserting means. The receiving means receives a downstream data message. The downstream data message includes a slot parameter. The slot parameter indicates new message slots and expansion slots within which reservation requests may be transmitted. The first slot selecting means selects one of the expansion slots. The second slot selecting means selects, on at least a pseudorandom basis, one of the new message slots. The inserting means inserts a previously transmitted reservation request in the selected one of the expansion slots of a designated future upstream message and inserts a new reservation request in the selected one of the new message slots of a future upstream message.

In accordance with yet another aspect of the present invention, a method of transmitting data in slots of upstream data messages comprises the following steps: a) receiving a downstream data message, wherein the downstream data message includes a range parameter R and a slot parameter, and wherein the slot parameter indicates new message slots NS and expansion slots ES in which reservation requests may be transmitted; b) selecting one of the expansion slots; c) selecting one of the new message slots according to the range parameter R; d) inserting a previously transmitted reservation request in the selected one of the expansion slots; and, e) inserting a new reservation request in the selected one of the new message slots.

In accordance with a further aspect of the present invention, a station for transmitting and receiving data over a communication medium comprises a slot expanding means, a slot parameter determining means, a range parameter determining means, and an inserting means. The slot expanding means expands minislots, which are in a data message received by the station and which experienced collision, to expansion minislots EMS according to a fixed search tree expansion procedure. The slot parameter determining means determines a slot parameter defining a future upstream data message. The slot parameter indicates (i) new message minislots NMS within which new reservation requests may be transmitted to the station, (ii) the expansion minislots EMS within which old reservation requests may be re-transmitted to the station, and (iii) data slots DS within which data may be transmitted to the station. The range parameter determining means determines a range parameter R useful in determining whether new reservation requests may be transmitted to the station. The inserting means inserts the slot parameter and the range parameter R in a downstream data message for communication over the communication medium.

In accordance with yet a further aspect of the present invention, a station comprises receiving means and transmitting means. The receiving means receives first and second downstream messages. The first downstream message defines a first upstream message having new message slots, expansion slots, and data slots. The second downstream message defines a second upstream message having new message slots and an address determining whether the station may transmit a reservation request in one of the new message slots of the second upstream message. The transmitting means is responsive to the first downstream message and (i) transmits a reservation request in a new message slot of the first upstream message if the station determines to do so, (ii) re-transmits a reservation request in an expansion slot of the first upstream message if the station had transmitted a reservation request in a slot which was in a previous upstream message and which was expanded in the first upstream message, and (iii) transmits data in a data slot, if any, reserved to the station. The transmitting means is responsive to the second downstream message and transmits a reservation request in a new message slot of the second upstream message if the address in the second downstream message corresponds to an address of the station.

In accordance with another of the present invention, a station comprises a receiving means, a transmission parameter generating means, and a transmitting means. The receiving means receives a downstream data frame having a contention range parameter R. The contention range parameter R has one of at least two possible priority values. The transmission parameter generating means generates a transmission parameter RN depending upon the priority of data to be transmitted by the station. The transmission parameter RN is constrained by the contention range parameter R. The transmitting means transmits a reservation request in a slot of a next upstream data frame if the transmission parameter RN corresponds to the slot in the next upstream data frame and if the reservation request relates to data corresponding to the transmission parameter RN.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
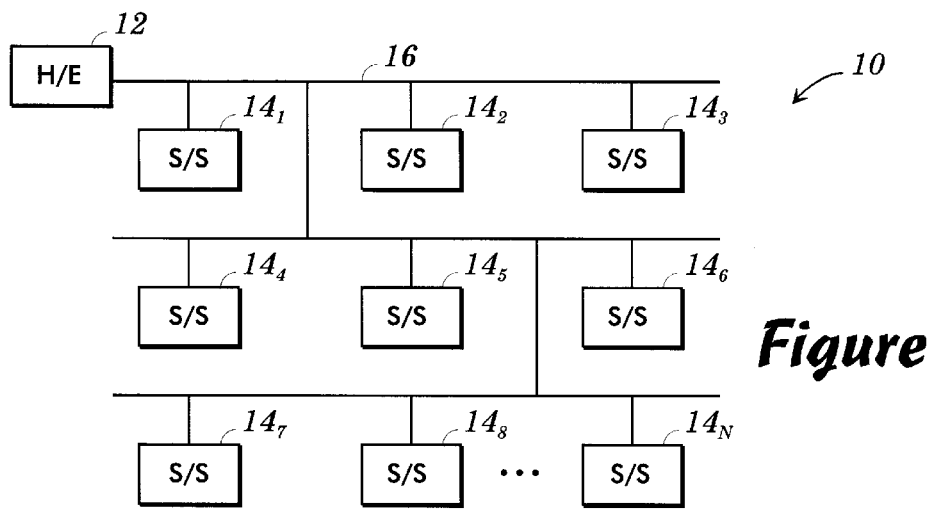
FIG. 1 is a schematic diagram of a CATV system which includes a headend connected to a plurality of subscriber stations by way of a cable and which is exemplary of a communication system configured in accordance with the present invention.

FIG. 1 illustrates a CATV system 10 which includes a headend 12, a plurality of subscriber stations $14_1$–$14_n$, and a cable 16 which interconnects the headend 12 and the subscriber stations $14_1$–$14_n$. The headend 12 may be of conventional hardware design incorporating a processor which may be programmed to support downstream communication over the cable 16 in accordance with the present invention. Similarly, the subscriber stations $14_1$–$14_n$ may be of conventional hardware design each incorporating a processor which may be programmed to support upstream communication over the cable 16 in accordance with the present invention.

According to the present invention, when the subscriber stations $14_1$–$14_n$ have data to communicate to the headend 12 over the cable 16, those subscriber stations first make a reservation request. In making a reservation request, the subscriber stations $14_1$–$14_n$ contend with one another for a limited but variable number of minislots in the upstream data frame because minislots carry the reservation requests from the subscriber stations $14_1$–$14_n$ to the headend 12. With respect to those reservation requests which are successfully received by the headend 12 (i.e., received by the headend 12 in minislots in which there are no collisions), the headend 12 acknowledges the reservation request by way of an acknowledgement transmitted by the headend 12 to the successful subscriber stations $14_1$–$14_n$. Accordingly, the upstream data frame is divided into slots S some or most of which are subdivided into minislots MS such that all contention and reservation activity takes place in the minislots of the upstream data frame and all data transmission takes place in un-subdivided data slots DS of the slots S.

The arrangement of minislots MS and data slots DS is specified by the headend 12 in the downstream data frame. The subscriber stations $14_1$–$14_n$ use this specified arrangement and certain other parameters in order to make a decision as to whether they can transmit reservation requests and data in a subsequent upstream data frame. Accordingly, the subscriber station $14_1$–$14_n$ contend for the bandwidth of the upstream channel. A successful reservation request results in the headend 12 reserving one or more data slots, based on availability, to each of the subscriber stations which had transmitted successful reservation requests. The number of reserved data slots which are available to any one subscriber station depends on the number of subscriber stations making successful reservation requests.

The sizes of the upstream and downstream data frames may be equal, may be fixed, and may be defined, for example, to have a size equal to at least the sum of the headend processing time and the round trip transmission delay of the cable 16.

Figure 2:
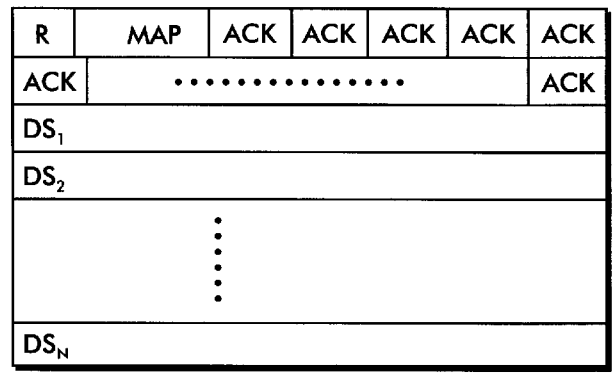
FIG. 2 illustrates a downstream data frame in which the headend transmits to the subscriber stations of FIG. 1.

An exemplary downstream data frame is illustrated in FIG. 2. Each such downstream data frame has four sections. The first section contains a range parameter R. The range parameter R may be used by the subscriber stations $14_1$–$14_n$ to contend for new message minislots when the contending subscriber stations have non-previously transmitted reservation requests to transmit.

The second section of the downstream data frame contains a slot parameter MAP. The slot parameter MAP defines which slots of the next upstream data frame are (i) new message minislots (NMS) which are used by the subscriber stations $14_1$–$14_n$ to transmit new reservation requests (i.e., reservation requests that have not been previously transmitted), (ii) expansion minislots (EMS) which are used by the subscriber stations $14_1$–$14_n$ to transmit reservation requests which were previously transmitted and which collided with reservation requests from other subscriber stations, and (iii) data slots (DS) which are reserved to the subscriber stations $14_1$–$14_n$ so that the subscriber stations $14_1$–$14_n$ can transmit data. The slot parameter MAP, for example, may be a map which defines the positions of each new message minislot, each expansion minislot, and each data slot in the next upstream data frame. The map allows these new message minislots, expansion minislots, and data slots to be interspersed throughout the upstream data frame. The subscriber stations $14_1$–$14_n$ read the map in order to determine which slots in the upstream data frames are new message minislots, which slots in the upstream data frames are expansion minislots, and which slots in the upstream data frames are data slots.

Alternatively, the slot parameter MAP may simply be boundaries which divide the slots in the upstream data frames between new message minislots, expansion minislots, and data slots. In this case, the new message minislots, the expansion minislots, and the data slots are segregated from one another.

In addition, minislots, which are contained in the next upstream data frame, may be assigned an RQ# (i.e., an RQ number). Thus, the new message minislots, which are contained in the next upstream data frame and which are to be used by the subscriber stations $14_1$–$14_n$ to transmit new reservation requests (i.e., reservation requests that have not been previously transmitted), may be assigned an RQ#=0. Accordingly, a subscriber station, which has a previously untransmitted reservation request to transmit, may transmit the previously untransmitted reservation request in a minislot which is assigned an RQ number of 0.

An RQ number other than 0 may be assigned (i) to the expansion minislots that are used by the subscriber stations $14_1$–$14_n$ to transmit reservation requests which were previously transmitted and which collided with reservation requests from other subscriber stations, and (ii) to contention minislot to which the expansion minislots correspond. For example, if collisions occurred in minislots 16, 27, 33, and 45 of the previous upstream data frame n, the headend 12 indicates in the slot parameter MAP that previous minislot 16 corresponds to an RQ number of 4, and the headend 12 assigns an RQ number of 4 to the expansion minislots which are in the next upstream data frame n+1 and to which previous minislot 16 is expanded. Similarly, (i) the headend 12 indicates in the slot parameter MAP that previous minislot 27 corresponds to an RQ number of 3, and the headend 12 assigns an RQ number of 3 to the expansion minislots which are in the next upstream data frame n+1 and to which previous minislot 27 is expanded, (ii) the headend 12 indicates in the slot parameter MAP that previous minislot 33 corresponds to an RQ number of 2, and the headend 12 assigns an RQ number of 2 to the expansion minislots which are in the next upstream data frame n+1 and to which previous minislot 33 is expanded, and (iii) the headend 12 indicates in the slot parameter MAP that previous minislot 45 corresponds to an RQ number of 1, and the headend 12 assigns an RQ number of 1 to the expansion minislots which are in the next upstream data frame n+1 and to which previous minislot 45 is expanded.

Accordingly, if a subscriber station had transmitted a reservation request in minislot 16 of the previous upstream data frame n, that subscriber station detects that the minislot 16 in the previous upstream data frame n is assigned an RQ number of 4 (i.e., a non-zero RQ number), and will re-transmit the reservation request in one of the expansion minislots which are assigned the same RQ number (in this case 4) and which are in the next upstream data frame n+1. It should be noted that the largest RQ number is determined by the number of minislots experiencing collisions. In the example above, four minislots (i.e., minislots 16, 27, 33, and 45) experienced collisions and, therefore, the largest RQ number is 4.

The third section of the downstream data frame is devoted to the acknowledgement of the reservation requests that are successfully made by the subscriber stations $14_1$–$14_n$ to the headend 12 in a previous upstream data frame. Each acknowledgement field (ACK) may include, for example, (i) a station ID, which is the address of the subscriber station to which an acknowledgement is given, and (ii) the data slot or data slots which are reserved to the subscriber station that is identified by the station ID and in which the identified subscriber station may transmit data to the headend 12.

The fourth section of the downstream data frame contains data slots which may be used by the headend 12 to communicate other data to the subscriber stations $14_1$–$14_n$.

Figure 3:
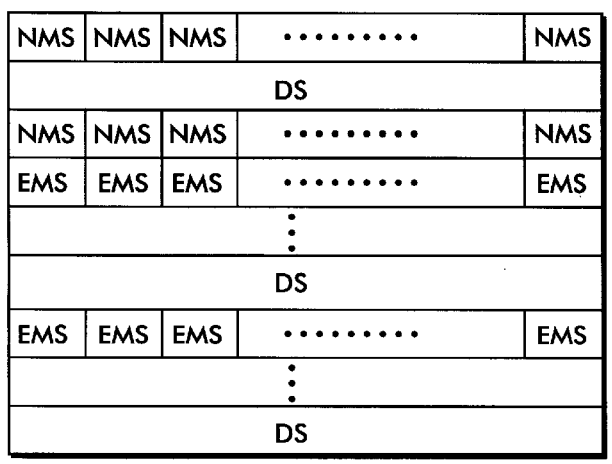
FIG. 3 illustrates an upstream data frame in which the subscriber stations transmit to the headend of FIG. 1.

An example of an upstream data frame is illustrated in FIG. 3. In the upstream channel, the subscriber stations $14_1$–$14_n$ use the slot parameter MAP of the previous downstream data frame in order to determine the definition of the next upstream data frame. The upstream data frame contains a plurality of slots. As shown in FIG. 3, a slot may be subdivided into new message minislots NMS, a slot may be subdivided into expansion minislots EMS, or a slot may be un-subdivided (or partially divided) and used as a data slot DS. The mix of new message minislots NMS, expansion minislots EMS, and data slots DS is defined by the headend 12 and varies depending upon load conditions. Accordingly, the number of minislots changes dynamically dependent upon the extent of collisions and of reservation requests in a reservation request queue DQ at the headend 12. A slot may be subdivided into a fixed number m of new message minislots NMS and/or expansion minislots EMS.

Figure 4:
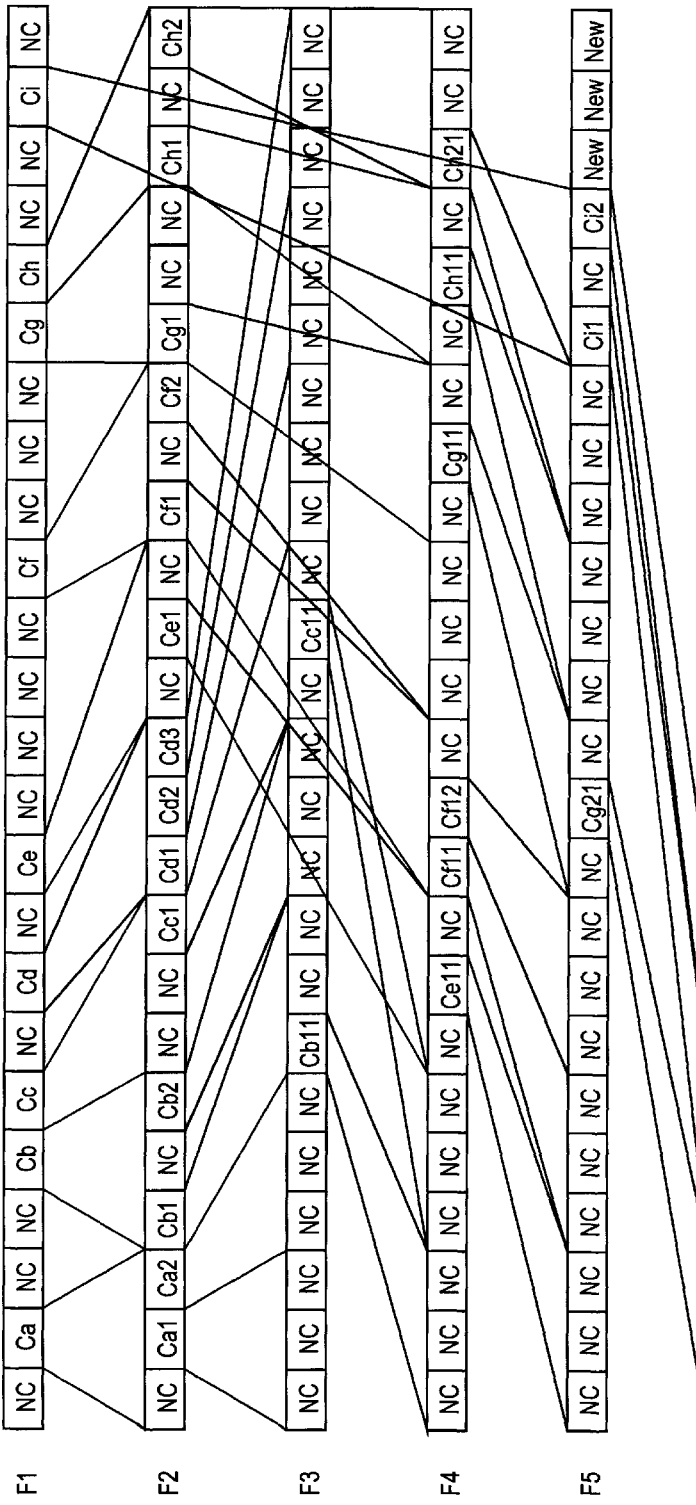
FIG. 4 illustrates an example of minislots in upstream data frames F1–F7 according to a fixed expansion search tree expansion algorithm.

When two or more reservation requests from corresponding subscriber stations collide in a new message minislot or in an expansion minislot of an upstream data frame, that new message minislot or expansion minislot is expanded into a number of expansion minislots in a subsequent upstream data frame. For example, FIG. 4 illustrates a fixed search tree expansion procedure that may be used to expand the new message minislots and/or the expansion minislots in which collisions occurred. With no collisions in a previous upstream data frame, all minislots in the next upstream data frame are new message minislots, and the subscriber stations $14_1$–$14_n$ are allowed to contend for any of these new message minislots. When collisions then occur, the system enters a first layer of contention. The upstream data frame F1 in FIG. 4 shows a first layer of contention. The minislots in which no collisions occurred are labelled NC, and the minislots in which collisions occurred are labelled C followed by a lower case letter to distinguish between such minislots.

Accordingly, the headend 12 expands each of the minislots in which collisions occur by an expansion coefficient E (which is three in the example of FIG. 4). The slot parameter MAP is generated based at least partially upon the expansion coefficient E. As a result of this expansion, the headend 12 expands each of the minislots in which collisions occur to three corresponding expansion minislots for a second layer of contention. For example, the minislot Ca is expanded to three expansion minislots in the next upstream data frame F2, the minislot Cb is expanded to three expansion minislots in the next upstream data frame F2, the minislot Cc is expanded to three expansion minislots in the next upstream data frame F2, and so on. The upstream data frame F2 also includes new message minislots labelled as NC in FIG. 4, and may include data slots (not shown).

Thus, as shown by the upstream data frame F2, a second layer of contention may result. For example, one of the three expansion minislots to which the minislot Ca was expanded contains no collisions, and the other two of these three expansion minislots (Ca1 and Ca2) contain collisions. Similarly, one of the three expansion minislots to which the minislot Cb was expanded contains no collisions, and the other two of these three resolution slots (Cb1 and Cb2) contain collisions.

The headend 12 then expands each of the minislots of the second layer of contention in which collisions occurred to three corresponding expansion minislots for a third layer of contention. For example, the expansion minislot Cb1 is expanded to three expansion minislots for the third layer of contention with the result that two of these three expansion minislots contain no collisions, and the other of these three expansion minislots (Cb11) contain collisions.

Figure 5:
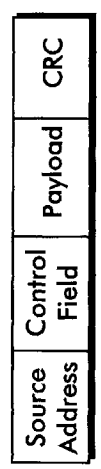
FIG. 5 illustrates a slot format of the upstream data frame.

FIG. 5 illustrates the data which is inserted into a minislot or data slot by a subscriber station. This data includes a source address, a control field, a payload, and error checking data. The source address is the address of the sending subscriber station. The control field indicates the type of message (for example, reservation request or data) transmitted by the subscriber station. The payload field contains either the number of data slots that the subscriber stations is requesting to be reserved in the case of a reservation request message or the data to be transmitted by the subscriber station in the case of a data message. The CRC field contains error checking information.

Figure 6A:
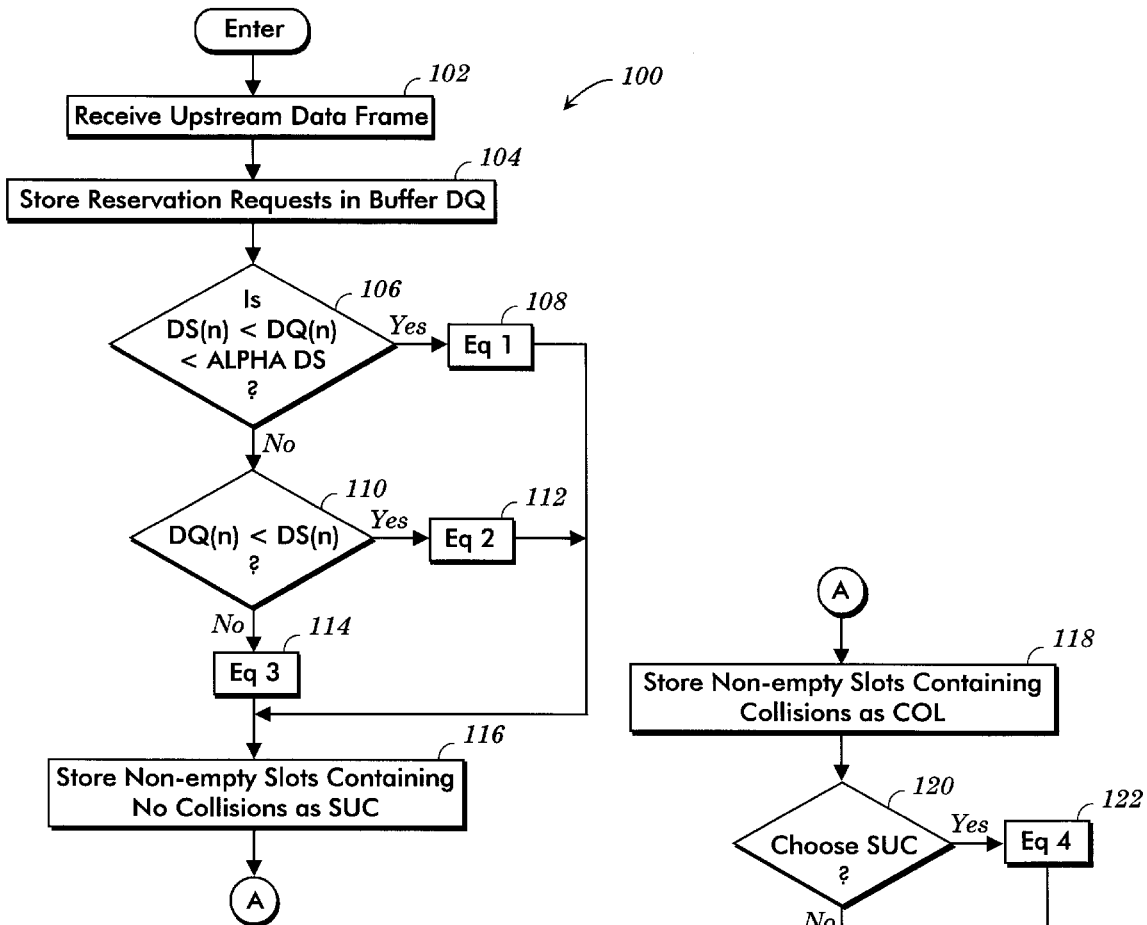
FIGS. 6A and 6B illustrate a program which is executed by the headend of FIG. 1 in an exemplary implementation of the present invention.
Figure 6B:
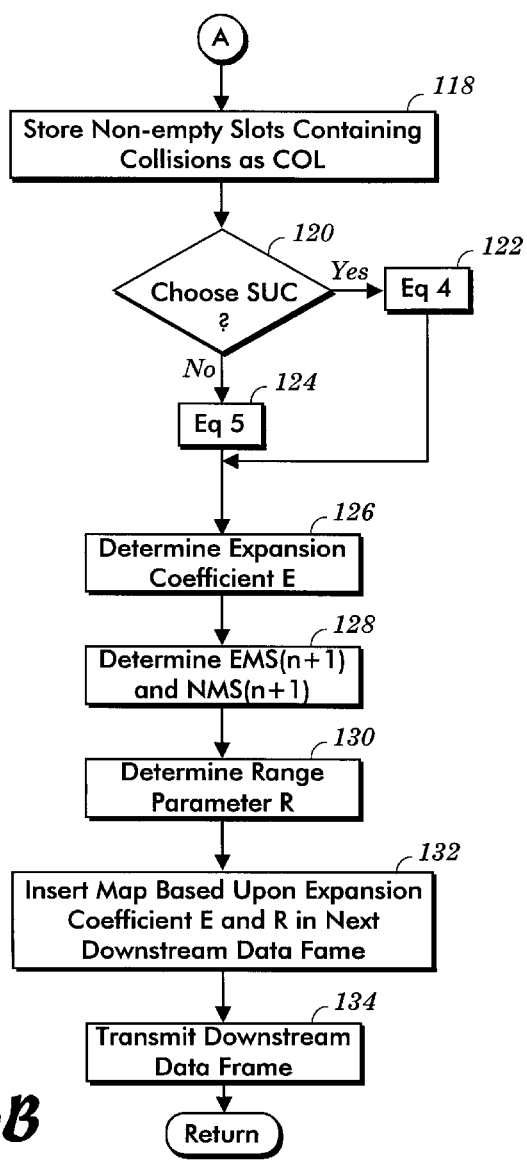

In determining (i) the number of new message minislots NMS for the next upstream data frame, (ii) the number of expansion minislots EMS for the next upstream data frame, (iii) the expansion coefficient E, and (iv) the range parameter R which is used by the subscriber stations $14_1$–$14_n$ to determine if they can transmit reservation requests in new message minislots, the headend 12 executes a program 100 which is illustrated in FIGS. 6A and 6B.

The program 100 is entered each time that an upstream data frame is received by the headend 12. When the program 100 is entered, a block 102 receives an upstream data frame, and a block 104 stores any reservation requests in this data frame in a reservation request queue DQ at the current time n. The block 104 also stores the number of empty minislots, the number of collision minislots (i.e., minislots in which reservation requests collided), and/or the number of successful minislots (i.e., minislots containing single reservation requests).

Thereafter, a block 106 determines whether the CATV system 10 is in steady state. When the CATV system 10 is in steady state, the number of reservation requests DQ(n) stored in the reservation request queue DQ at the current discrete time n is greater than the number of data slots DS(n) in the data frame just received by the block 102, but is less than this number of data slots DS(n) multiplied by a constant α. The constant α may be 1.6, for example. The upstream data frame just received is designated herein as upstream data frame n and is received at discrete time n. If the system is in steady state, a block 108 determines the number of minislots MS to be allocated to the next upstream data frame n+1 according to the following equation:

$$MS(n+1) = M = \frac{S}{\frac{k}{e} + \frac{1}{m}} \quad (1)$$

wherein S is the total number of slots in a data frame, m is the number of minislots into which a slot may be subdivided, e is 2.718281828 ..., MS(n+1) is the number of minislots for the next upstream data frame, k is the average number of data slots reserved by reservation requests, and M is the steady state number of minislots. Because a whole slot is used as a data slot, the number of data slots in the next upstream data frame n+1 is, accordingly, given by the following equation:

$$DS(n+1) = S - \frac{MS(n+1)}{m}.$$

If the block 106 determines that the CATV system is not in steady state, a block 110 determines whether the number of reservation requests DQ(n) in the reservation request queue DQ of the headend 12 at discrete time n is less than the number of data slots DS(n) in the upstream data frame just received. If so, a block 112 determines the number of minislots MS to be allocated to the next upstream data frame n+1 according to the following equation:

$$MS(n+1) = m(S - DQ(n)) \quad (2)$$

wherein DQ(n) is the number of reservation requests DQ(n) in the reservation request queue DQ of the headend 12 at time n. The number of data slots DS(n+1) in the next upstream data frame n+1, accordingly, is set to DQ(n).

If the block 106 determines that the CATV system 10 is not in steady state, and if the block 110 determines that the number of reservation requests DQ(n) in the reservation request queue DQ of the headend 12 at discrete time n is not less than the number of data slots DS(n) in the upstream data frame just received, a block 114 determines the number of minislots MS to be allocated to the next upstream data frame n+1 according to the following equation:

$$MS(n+1) = M - m\frac{DQ(n) - \alpha DS(n)}{6} \quad (3)$$

where DS(n) is the number of reserved data slots in the upstream data frame just received. The number of data slots DS(n+1) in the next upstream data frame n+1 is, accordingly, given by the following equation:

$$DS(n+1) = S - \frac{MS(n+1)}{m}.$$

As is described below, the minislots MS(n+1) will be divided between new message minislots and/or expansion minislots.

A block 116 analyzes the upstream data frame received by the block 102 in order to determine which non-empty new message minislots therein contain non-contending reservation requests. These new message minislots contain reservation requests from only one subscriber station. The block 116 sets a parameter SUC equal to the number of these new message minislots. A block 118 also analyzes the received upstream data frame to determine which non-empty new message minislots therein contain contending reservation requests. These new message minislots contain reservation requests from more than one subscriber station. The block 118 sets a parameter COL equal to the number of these new message minislots.

A block 120 chooses whether to calculate the number of new active stations, N, based upon the parameter SUC. New active stations are those which transmitted new reservation requests. If the number of new active stations, N, is to based upon the parameter SUC, a block 122 determines the number of new active stations N from the following equation:

$$SUC = NMS\frac{N}{NMS-1}\left(\frac{NMS-1}{NMS}\right)^N \quad (4)$$

wherein N is the number of new active stations, wherein NMS is a total number of new message minislots in the upstream data frame just received, and wherein SUC is the number of non-empty new message minislots in an upstream data frame in which collisions did not occur as determined by the block 116.

Figure 7:
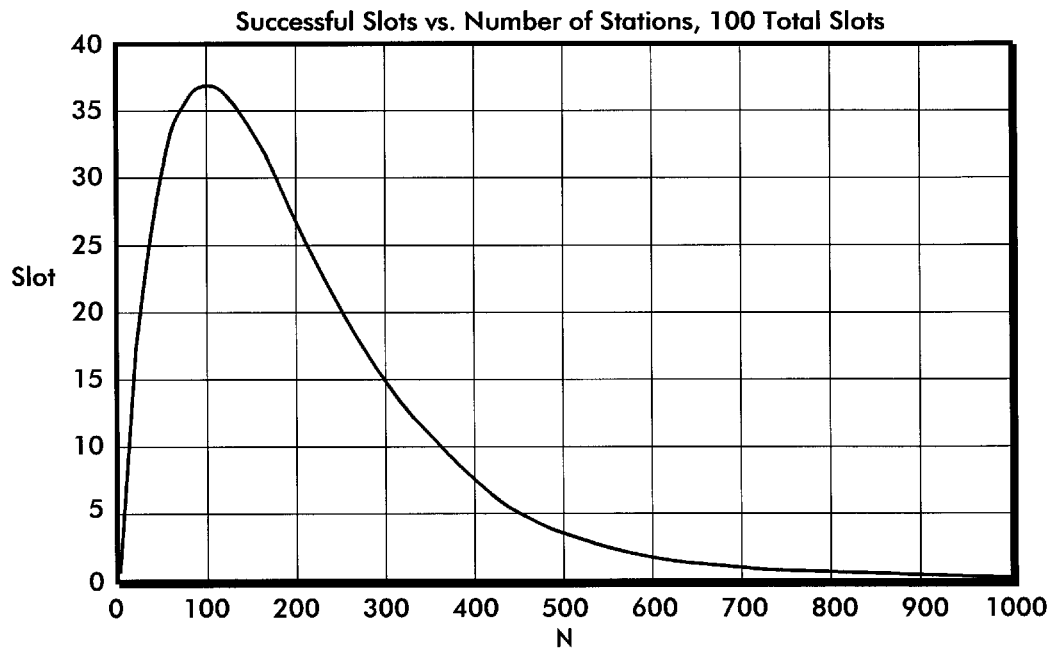
FIGS. 7 and 8 are graphs useful in explaining the program of FIGS. 6A and 6B; and, FIGS. 9A and 9B illustrate a program which is executed by each of the subscriber stations of FIG. 1 in the exemplary implementation of the present invention.
Figure 8:
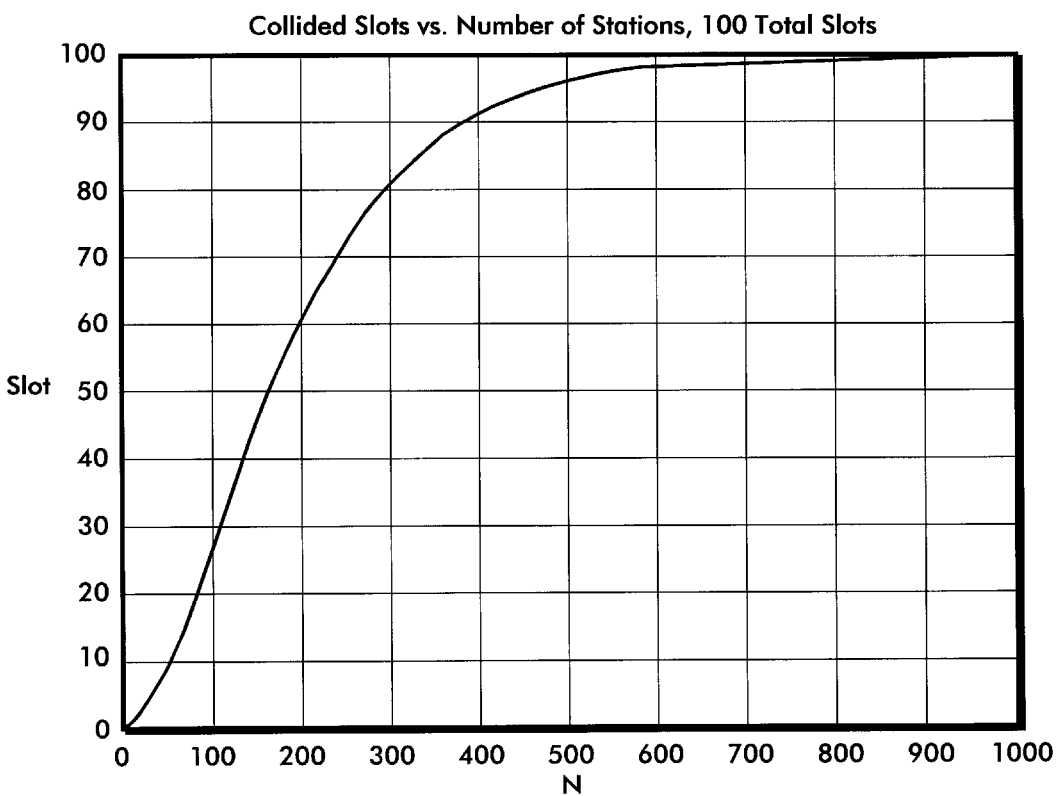

Alternatively, the number of new active stations N may be determined by the block 122 from a lookup table which is stored in memory at the headend 12 according to the graph shown in FIG. 7. This graph corresponds to equation (4). The vertical axis of this graph is the input axis. The parameter SUC as determined by the block 104 is input along the vertical axis. The horizontal axis is the output axis along which the number of new active stations N is determined as a function of the input vertical axis. When using the graph of FIG. 7, an ambiguity arises because there are two output values along the horizontal axis for each input along the vertical axis. This ambiguity may be resolved by the use of the collision curve shown in FIG. 8. This curve of FIG. 8 is explained in more detail below.

On the other hand, if the block 120 chooses not to calculate the number of new active stations based upon the parameter SUC, a block 124 determines the number of new active stations N from the following equation:

$$COL = NMS - NMS\frac{N}{NMS-1}\left(\frac{NMS-1}{N}\right)^N - NMS\left(\frac{NMS-1}{NMS}\right)^N \quad (5)$$

wherein N is the number of new active stations, wherein NMS is a total number of new message minislots in the upstream data frame just received, and wherein COL is the number of new message minislots which are in an upstream data frame just received and in which collisions occurred as determined by the block 118.

Alternatively, the number of new active stations N may be determined from a lookup table which is stored in memory at the headend 12 according to the graph shown in FIG. 8. This graph corresponds to equation (5). The vertical axis of this graph is the input axis. The parameter COL as determined by the block 118 is input along the vertical axis. The horizontal axis is the output axis along which the number of new active stations N is determined as a function of the vertical axis.

The block 120 may make its decision based upon a user set flag or upon other criteria.

It should be apparent that the CATV system 10 can be arranged to determine the number of new active stations N exclusively from equation (4). If so, the block 122 must use the collision parameter COL and the block 124 in order to resolve the ambiguity described above. Alternatively, the CATV system 10 can be arranged to determine the number of new active stations N exclusively from equation (5), in which case there is no ambiguity to resolve. If so, the blocks 116, 120, and 122 may be eliminated. As a further alternative, the number of new active stations N can be determined from a combination of the parameter SUC and the parameter COL.

A block 126 determines an expansion coefficient E. This expansion coefficient E controls the number of expansion minislots to which a minislot, that has experienced collisions in the previous upstream data frame, is expanded. For example, as shown in FIG. 4, the minislot Ca in the upstream frame F1 experienced collisions and was expanded to three expansion minislots in the upstream frame F2. In this case, the expansion coefficient E is three, although the expansion coefficient E may be two or any other number. The block 126 may be arranged to retrieve the expansion coefficient E from memory. In this way, the expansion coefficient E may be set by the user and may be manually adjusted as needed.

A block 128 determines the number of expansion minislots in the next upstream data frame n+1 as the parameter EMS(n+1), and the number of new message minislots in the next upstream data frame n+1 as the parameter NMS(n+1). The block 128 determines an initial parameter $EMS_i(n+1)$ by expanding the new message minislots and expansion minislots in the upstream data frame n in which collisions occurred according to the expansion coefficient E. The block 128 then subtracts the initial parameter $EMS_i(n+1)$ from the number of minislots MS to be allocated to the next upstream data frame n+1 as determined by the blocks 106–114. If the result is less than $NMS_{min}$ (which may be set to zero, four, or any other number), the block 128 sets EMS(n+1) equal to MS–$NMS_{min}$, and sets NMS(n+1) equal to $NMS_{min}$, where MS is determined by the blocks 106–114. If the result is not less than $NMS_{min}$, the block 128 sets EMS(n+1) equal to $EMS_i(n+1)$, and sets NMS(n+1) equal to MS–$EMS_i(n+1)$. In this way, an upstream data frame contains no less than $NMS_{min}$ new message minislots.

A block 130 determines the range parameter R from the parameter COL according the following equation:

$$R(n+1) = \max\left\{\min\left\{N, R(n) - NMS(n) + \frac{e-1}{e-2}COL(n) + \frac{NMS(n)}{e}\right\}, NMS(n+1)\right\}, \quad (6)$$

where n indicates the current frame, n+1 indicates the next upstream data frame, R(n+1) is the range parameter for the next upstream data frame n+1, R(n) is the range parameter for the upstream data frame n just received, N represents the number of new active stations as determined by some combination of the blocks 116–124, NMS(n+1) is the number of new message minislots in the next upstream data frame n+1 as determined by the block 128, NMS(n) is the number of new message minislots in the upstream data frame n just received, COL(n) is the parameter COL as determined by the block 118 based upon the upstream data frame n just received, and e is 2.718281828 . . . .

A block 132 determines the slot parameter MAP. If the slot parameter MAP is a map of the new message minislots, expansion minislots, and data slots, the block 132 constructs the map based upon NMS(n+1) and EMS(n+1) as determined by the block 128 and upon DS as described above in connection with the blocks 106–114, according to any desired rule. Alternatively, the block 132 determines the slot parameter MAP by allotting a first portion of the upstream data frame n+1 to the NMS(n+1) new message minislots, by allotting a next portion of the upstream data frame n+1 to the EMS(n+1) expansion minislots, and by allotting a remaining portion of the upstream data frame n+1 to the DS data slots. The block 132 also assigns RQ numbers and minislot designations as discussed above. The block 132 inserts the slot parameter MAP, and inserts the range parameter R(n+1) as the parameter R, into the next downstream data frame to be transmitted.

A block 134 inserts any additional information into the next downstream data frame and transmits the next downstream data frame over the cable 16. Thereafter, the program 100 returns to the block 102 to await the next upstream data frame.

Figure 9A:
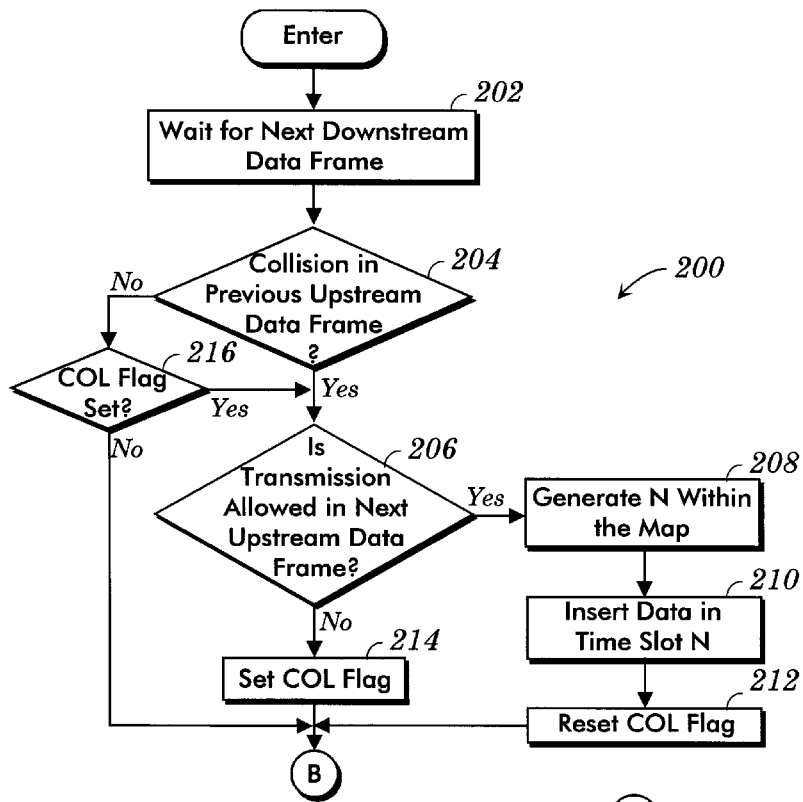

Each of the subscriber stations $14_1$–$14_n$ executes a program 200 as shown in FIG. 9A. When the program 200 is entered, a block 202 causes its corresponding subscriber station to wait for the next downstream data frame which contains, inter alia, the range parameter R, the slot parameter MAP, and acknowledgements (which include reserved data slot allocations to the subscriber station). When the next downstream data frame is received, a block 204 determines from the slot parameter MAP whether its corresponding subscriber station, and one or more other subscriber stations, transmitted reservation requests in the same new message minislot or expansion minislot of the previous upstream data frame, i.e., whether the reservation request transmitted by its corresponding subscriber station collided with a reservation request transmitted by one or more other subscriber stations. The block 204 can make this determination, for example, by comparing the new message minislot or expansion minislot in which its corresponding subscriber station transmitted reservation requests in the previous upstream data frame to the minislots that are expanded in the slot parameter MAP (e.g., by determining whether the new message minislot or expansion minislot, which was in the previous upstream data frame and in which its subscriber station transmitted a reservation request, has been assigned, in the downstream data frame just received, an RQ number other than 0).

If the block 204 determines that its corresponding subscriber station, and one or more other subscriber stations, transmitted reservation requests in the same new message minislot or expansion minislot of the previous upstream data frame, a block 206 determines, from the slot parameter MAP, whether its corresponding subscriber station is allowed to re-transmit its previously contending data in the next upstream data frame. For example, the block 206 may make this determination by comparing the RQ number, which is assigned to the new message minislot or expansion minislot of the previous upstream data frame in which its subscriber station transmitted its previously contending reservation request, to the RQ numbers assigned to the minislots of the next upstream data frame. If the block 206 does not find a match, the block 206 determines that it is not allowed to re-transmit its previously contending reservation request. On the other hand, if the block 206 finds a match, the block 206 determines that it is allowed to re-transmit its previously contending reservation request.

Accordingly, if the block 206 determines that it is allowed to re-transmit its previously contending reservation request, a block 208 generates a random number N within the range of the expansion minislots assigned to its corresponding subscriber station. That is, the random number N is generated so that it equals one of the expansion minislots corresponding to the new message minislot or expansion minislot in which the corresponding subscriber station transmitted a contending reservation request data in the previous upstream data frame (i.e., so that the random number N equals one of the expansion minislots having the same RQ number as the RQ number assigned to the new message minislot or expansion minislot in the previous upstream data frame in which the subscriber station, corresponding to the block 206, transmitted its contending reservation request). A block 210 then inserts the previously contending reservation request in the expansion minislot N of the next upstream data frame for transmission. A block 212 resets a COL flag.

It should be noted that, if the block 206 determines that the RQ number, that was assigned to the new message minislot or expansion minislot of the previous upstream data frame in which its subscriber station transmitted its previously contending reservation request, is greater than the largest RQ number assigned to the minislots of the next upstream data frame, the block 208 generates a random number N so that the random number N equals one of the expansion minislots which is in the next upstream data frame and which has the largest RQ number assigned to it. The block 210 then inserts the previously contending reservation request in that expansion minislot N.

On the other hand, the block 206 may determine that its corresponding subscriber station is not permitted to re-transmit its previously contending reservation request in the next upstream data frame (i.e., that its corresponding subscriber station has been assigned a later upstream data frame in which it is allowed to re-transmit its previously contending reservation request). For example, the block 206 may determine that the RQ number, which was assigned to the new message minislot or expansion minislot of the previous upstream data frame in which its subscriber station transmitted its previously contending reservation request, is smaller than the smallest RQ number assigned to the minislots of the next upstream data frame. In this case, a block 214 sets the COL flag.

If the block 204 determines that its corresponding subscriber station, and one or more other subscriber stations, did not transmit reservation requests in the same minislot of the previous upstream data frame, a block 216 determines whether the COL flag is set. As indicated by the block 214, the COL flag is set when the subscriber station has unsuccessfully transmitted a reservation request but it is not permitted to re-transmit this reservation request in the next upstream data frame. Accordingly, during a subsequent pass through the program 200, the block 216 allows the block 206 to determine if the subscriber station can now retransmit its previously contending reservation request. If the COL flag is set, program flow passes to the block 206.

Figure 9B:
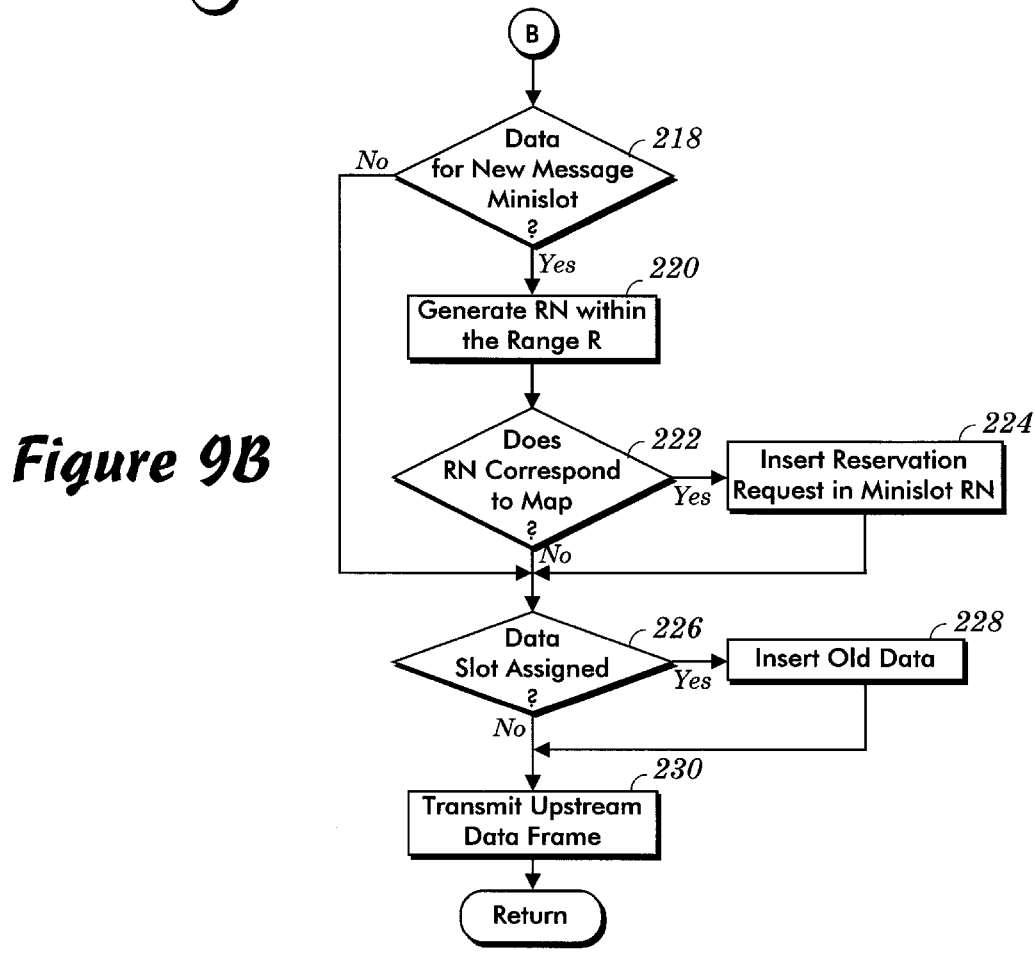

If the COL flag is not set as determined by the block 216, or after the block 214 sets the COL flag, or after the block 212 resets the COL flag, a block 218 (FIG. 9B) determines whether the corresponding subscriber station (i) has data to transmit and (ii) has not previously transmitted a reservation request for this data. If the corresponding subscriber station (i) has data to transmit and (ii) has not previously transmitted a reservation request for this data, a block 220 generates a transmission parameter RN within the range established by the range parameter R that is contained in the downstream data frame just received from the headend 12. The range established by the range parameter R may be the range between zero and R inclusive, the range between one and R inclusive, or the like. This range contains all of the new message minislots which are assigned an RQ number of 0. The transmission parameter RN is used to determine whether its corresponding subscriber station is permitted to transmit a new reservation request to the headend 12. The transmission parameter RN may be generated by the block 220 as a random number. Thus, because each subscriber station $14_1$–$14_n$ generates its own transmission parameter RN as a random value within the range established by the range parameter R, the transmission probabilities of the subscriber stations $14_1$–$14_n$ are statistically spread along the interval of the range defined by the range parameter R.

A block 222 determines whether the value of N just generated by the block 220 corresponds to one of the new message minislots as defined by the slot parameter MAP contained in the downstream data frame just received from the headend 12. That is, if the slot parameter MAP is a map, the block 222 determines whether the value of N is equal to one of the new message minislots defined in the map. On the other hand, if the slot parameter MAP contains boundaries between the new message minislots, expansion minislots, and data slots, the block 222 determines whether the value of N falls within the new message minislot boundary. If the value of N corresponds to the new message portion of the slot parameter MAP, a block 224 inserts a transmission reservation request in the new message minislot which is equal to the value of N and which is in the upstream data frame being assembled for transmission back to the headend 12.

If the block 222 determines that the value of N does not correspond to the new message portion of the slotparameter MAP, or if the block 218 determines that the subscriber station has no new data for which a reservation request is required, or after the block 224 has inserted a reservation request in the new message minislot having a value equal to N, a block 226 determines whether the downstream data frame just received has a reserved data slot in the next upstream data frame within which the subscriber station may transmit old data. Old data is data for which a previous reservation request had been successfully made by the appropriate subscriber station and the headend 12 has reserved one or more data slots for the data. If so, a block 228 inserts this old data into the data slot reserved by the headend 12 for this subscriber station.

If the block 226 determines that a data slot had not been reserved for the subscriber station, or after the block 228 inserts old data into a data slot reserved in response to a previous reservation request, a block 230 transmits its portion of the next upstream data frame oven the cable 16. Thereafter, the program 200 returns to the block 202 to await the next downstream data frame.

Accordingly, the present invention combines the adaptive allocation of channel resources dependent upon the amount of demand created by the subscriber stations for the upstream channel with a fixed search tree expansion procedure for resolving contention between transmitting stations. As the number of subscriber stations having data to transmit to the headend 12 increases, the chance that collisions will occur in the upstream data frames also increases. As the number of collisions in the upstream data frames increases, the value of the range parameter R is increased which tends to decrease the probability that a subscriber station will be able insert a reservation request in a minislot of subsequent upstream data frames. Moreover, as the number of subscriber stations having data to transmit to the headend 12 increases, the number of reservation requests in the reservation request queue DQ of the headend 12 also increases. As the number of reservation requests in the reservation request queue DQ increases, the number of minislots that are allocated to subsequent upstream data frames decreases.

Similarly, as the number of subscriber stations having data to transmit to the headend 12 decreases, the chance that collisions will occur in the upstream data frames also decreases. As the number of collisions in the upstream data frames decreases, the value of the range parameter R is decreased which tends to increase the probability that a subscriber station will be able insert a reservation request in a minislot of subsequent upstream data frames. Moreover, as the number of subscriber stations having data to transmit to the headend 12 decreases, the number of reservation requests in the reservation request queue DQ of the headend 12 also decreases. As the number of reservation requests in the reservation request queue DQ decreases, the number of minislots that are allocated to subsequent upstream data frames increases.

Thus, as the number of reservation requests increases, the headend 12 decreases the number of minislots allocated to subscriber stations in order to reduce the number of successful reservation requests being transmitted by the subscriber stations in the upstream data frames. Also, as the number of collisions in minislots of upstream data frames increases, the value of the range parameter R is increased which has the effect of reducing the number of subscriber stations permitted to transmit reservation requests in the minislots which are allocated to subsequent upstream data frames. Accordingly, the slot parameter MAP and the range parameter R work together to adaptively regulate data traffic in the CATV system 10.

At the same time, contention occurring in minislots is resolved using a fixed tree search procedure. Thus, contention reduction is enhanced and the number of iterations required to reduce contention is lessened, which reduces delay in the transmission of data.

The use of RQ numbers has several advantages. For example, an RQ number of 0 can be assigned to a select group of subscriber stations by use of a selective group address or specific individual addresses. In this way, the probability that certain select subscriber stations can transmit reservation requests may be controlled. Accordingly, a limited number subscriber stations may be assigned an RQ number of 0 to thereby increase the probability that they will successfully transmit reservation requests.

Alternatively, a specific type of subscriber stations may be assigned an RQ number of 0 by use of a selective group address or specific individual addresses in order to thereby allow only that type of subscriber station to successfully transmit reservation requests. Thus, meters could be read during off peak hours when traffic from other types of subscriber stations is usually low.

Certain modifications of the present invention have been discussed above. Other modifications will occur to those practicing in the art of the present invention. For example, as described above, each subscriber station determines its transmission parameter RN as a random number which is only constrained to fall within the range established by the range parameter R. Instead, the transmission parameter RN may be determined by each subscriber station on a pseudo-random basis or on any other basis which tends to spread the transmission parameters RN of the subscriber stations throughout the range R. Therefore, the random generation of the transmission parameter RN should be understood to include not only random generation of the transmission parameter RN but also pseudorandom generation of the transmission parameter RN and generation of the transmission parameter RN by similar methods.

Also, the sizes of the upstream and downstream data frames are described above as being fixed. However, the sizes of the upstream and downstream data frames may be variable so that the size of these data frames, for example, may be dependent upon traffic load.

In addition, a specific procedure for determining the range parameter R is described above. Instead, the range parameter R may be determined in other ways. For example, the range parameter R may be determined as a function of the successful parameter SUC or as a function of both the collision parameter COL and the successful parameter SUC.

Moreover, as described above, the contention range parameter R is used by the subscriber stations in generating the transmission parameter RN when the subscriber stations have data to transmit, regardless of the priority of that data. Alternatively, a contention range parameter $R_L$ may be used by the subscriber stations in generating one transmission parameter $RN_L$ when the subscriber stations have low priority data to transmit, and a different contention range parameter $R_H$ may be used by the subscriber stations in generating another transmission parameter $RN_H$ when the subscriber stations have high priority data to transmit. The transmission parameter $RN_L$ corresponding to the contention range parameter $R_L$ then determines if the subscriber stations can transmit low priority data, and the transmission parameter $RN_H$ corresponding to the contention range parameter $R_H$ then determines if the subscriber stations can transmit high priority data. Accordingly, the subscriber stations can be given a greater chance of successfully transmitting a reservation request when they have high priority data to transmit.

Also as described above, the cable 16 interconnects the headend 12 and the subscriber stations $14_1$–$14^n$. However, the headend 12 and the subscriber stations $14_1$–$14_n$ may be interconnected by any communication medium such as a twisted pair, a fiber optic cable, over the air, by way of satellite, and/or the like.

As described above, the number of new active stations N can be determined from the parameters SUC and/or COL. However, the number of new active stations N can be determined instead from the number of empty of slots (i.e., a parameter EMP) in a previous upstream data frame, or by a combination of the parameters EMP, SUC, and/or COL.

Furthermore, the present invention has been described above in the context of a CATV system. It should be understood, however, that the present invention is useful in a wide variety of communication systems.

Also, as described above, if an upstream data frame is to contain minislots, the minimum number of new message minislots that upstream data frame can have is $NMS_{min}$. In order to accommodate this minimum number of new message minislots, it may be desirable to adjust the size of the upstream data frame. It may also be necessary to adjust the size of the upstream data frame if there are not enough expansion minislots in a predetermined number of upstream data frames to efficiently resolve contention.

Moreover, the minimum number of new message minislots $NMS_{min}$ need not be fixed. Instead, the number of expansion minislots is first determined and is then subtracted from the total number of minislots MS. If the result of this subtraction is that there is one minislot that can be assigned as a new message minislot, then a slot is subdivided by m to produce m+1 new message minislots. Similarly, if the result of this subtraction is that there are two minislots that can be assigned as new message minislots, then a slot is subdivided by m to produce m+2 new message minislots, if the result of this subtraction is that there are three minislots that can be assigned as new message minislots, then a slot is subdivided by m to produce m+3 new message minislots, and so on. A cap may be put on this procedure so that if the result of this subtraction is that there are four minislots that can be assigned as new message minislots, then only four minislots are assigned as new message minislots.

Furthermore, the search tree expansion procedure is described above as being fixed. However, the search tree expansion procedure of the present invention may be other than fixed. For example, the search tree expansion procedure of the present invention may be dynamic.

Also, as described above, contention activities take place in new message minislots (NMS) and in expansion minislots (EMS). However, contention activities may alternatively take place in normal slots such as new message slots (NS) and in expansion slots (ES). In this case, equation (1) may be rewritten according to the following equation:

$$CS(n+1) = M = \frac{S}{\frac{k}{e}+1}$$

wherein CS(n+1) is the total number of contention slots in a data frame, CS=NS+MS, n+1 designates the next upstream data frame, e is 2.718281828 . . . , k is the average number of data slots reserved by reservation requests, and M is the steady state number of contention slots; equation (2) may be rewritten according to the following equation:

$$CS(n+1)=S-DQ(n)$$

wherein DQ(n) is the number of reservation requests DQ(n) in the reservation request queue DQ of the headend 12 at time n; equation (3) may be rewritten according to the following equation:

$$CS(n+1) = M - \frac{DQ(n) - \alpha DS(n)}{6}$$

where DS(n) is the number of reserved data slots in the upstream data frame just received; equation (4) may be rewritten according to the following equation:

$$SUC = NS \frac{N}{NS-1} \left(\frac{NS-1}{NS}\right)^N$$

wherein N is the number of new active stations, wherein NS is a total number of new message slots in the upstream data frame just received, and wherein SUC is the number of non-empty new message slots in an upstream data frame in which collisions did not occur; and equation (5) may be rewritten according to the following equation:

$$COL = NS - NS \frac{N}{NS-1}\left(\frac{NS-1}{N}\right)^N - NS\left(\frac{NS-1}{NS}\right)^N$$

wherein N is the number of new active stations, wherein NS is a total number of new message slots in the upstream data frame just received, and wherein COL is the number of new message slots which are in an upstream data frame just received and in which collisions occurred. Accordingly, slots as referred to herein includes full slots, partial slots, minislots, or the like unless otherwise specified.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A station comprising:

a receiver arranged to receive a downstream data frame having a range parameter R and a parameter MAP, wherein the parameter MAP defines a number of new message minislots NMS, a number of expansion slots EMS, and a number of data slots DS in a next upstream data frame;

a transmission parameter generator arranged to generate a transmission parameter RN, wherein the transmission parameter RN is constrained by the range parameter R; and, a transmitter arranged to transmit a reservation request in a new message minislot of the next upstream data frame if the transmission parameter RN bears a predetermined relationship to the new message minislot, to re-transmit a reservation request in an expansion minislot of the next upstream data frame if the station had transmitted a reservation request in a minislot which was in a previous upstream data frame and which was expanded in the next upstream data frame, and to transmit data in a data slot, if any, reserved to the station.

2. The station of claim 1 wherein the next upstream data frame has S slots, wherein a slot is divided into m minislots, and wherein S=(NMS+EMS)/m+DS.

3. The station of claim 1 wherein the transmitter transmits a new reservation request only if the transmission parameter RN corresponds to a new message minislot.

4. The station of claim 1 wherein the transmission parameter RN is a random number.

5. The station of claim 1 wherein the transmitter comprises:

a random slot selector arranged to randomly select one of the expansion minislots; and, a reservation request inserter arranged to insert a reservation request in the randomly selected expansion minislot.

6. The station of claim 1 wherein the next upstream data frame has MS(n+1) minislots, and wherein MS(n+1)=NMS(n+1)+EMS(n+1).

7. The station of claim 6 wherein:

if $DS(n)<DQ(n)<\alpha DS(n)$, $$MS(n+1) = M = \frac{S}{\frac{k}{e}+\frac{1}{m}}$$

wherein MS is the number of minislots in a data frame at discrete time n+1 and corresponds to the parameter MAP, wherein DS(n) is the number of data slots in a data frame at discrete time n, wherein DQ(n) is the number of reservation requests waiting to be processed at discrete time n, wherein α is a constant, wherein M is the number of minislots in steady state, wherein S is the number of slots in a data frame, wherein k is a number corresponding to an average number of data slots reserved by reservation requests, and wherein m is the number of minislots into which a slot of a data frame may be subdivided;

if DQ(n)<DS(n), $$MS(n+1)=m(S-DQ(n));$$

and, if DQ(n)>αDS(n), $$MS(n+1) = M - m\frac{DQ(n) - \alpha DS(n)}{6}.$$

8. The station of claim 1 wherein the expansion minislots EMS are minislots which are expanded from contention minislots according to a fixed search tree expansion procedure.

9. A station for transmitting data in slots of upstream data messages over a communication medium comprising:
  a) a receiver arranged to receive a downstream data message, wherein the downstream data message includes a slot parameter, and wherein the slot parameter indicates new message slots and expansion slots within which reservation requests may be transmitted;
  b) a first slot selector arranged to select one of the expansion slots;
  c) a second slot selector arranged to select, on at least a pseudorandom basis, one of the new message slots; and,
  d) an inserter arranged to insert a previously transmitted reservation request in the selected one of the expansion slots of a designated future upstream message and to insert a new reservation request in the selected one of the new message slots of a future upstream message.

10. The station of claim 9 wherein an upstream data message has S slots, wherein S is dependent upon NS and ES, wherein NS designates a number of new message slots in the upstream data message, and wherein ES designates a number of expansion slots in the upstream data message.

11. The station of claim 9 wherein the downstream data message contains a range parameter R, wherein the second slot selector generates a transmission parameter RN constrained by the range parameter R, and wherein the inserter inserts a reservation request in a new message slot if the transmission parameter RN bears a predetermined relationship to a new message slot.

12. The station of claim 11 wherein the transmission parameter RN is a random number.

13. The station of claim 9 wherein the first slot selector randomly selects the selected one of the expansion slots and wherein the inserter inserts the reservation request in the randomly selected one of the expansion slots.

14. The station of claim 9 wherein an upstream data message has S slots, wherein an upstream data message has NS new message slots, wherein an upstream data message has ES expansion slots, wherein CS=NS+ES, wherein:
  if DS<DQ<αDS, $$CS = M = \frac{S}{\frac{k}{e}+1}$$

wherein DS=S−CS, wherein DQ is the number of reservation requests waiting to be processed in a reservation request queue, wherein α is a constant, wherein M is the number of CS in steady state, and wherein k is the average number of data slots reserved by reservation requests;
  if DQ<DS, $$CS=S-DQ;$$

and, if DQ>αDS, $$CS = M - \frac{DQ - \alpha DS}{6}.$$

15. The station of claim 9 wherein the expansion slots are slots which are expanded from contention slots according to a fixed search tree expansion procedure.

16. A method of transmitting data in slots of upstream data messages comprising the following steps:
  a) receiving a downstream data message, wherein the downstream data message includes a range parameter R and a slot parameter, and wherein the slot parameter indicates new message slots and expansion slots in which reservation requests may be transmitted;
  b) selecting one of the expansion slots;
  c) selecting one of the new message slots according to the range parameter R;
  d) inserting a previously transmitted reservation request in the selected one of the expansion slots; and,
  e) inserting a new reservation request in the selected one of the new message slots.

17. The method of claim 16 wherein the step c) comprises the steps of:
  generating a transmission parameter RN constrained by the range parameter R; and,
  if N falls within the new message slots, selecting new message slot N.

18. The method of claim 17 wherein the transmission parameter RN is a random number.

19. The method of claim 16 wherein the step b) comprises the step of randomly selecting the selected one of the expansion slots.

20. The method of claim 16 wherein an upstream data message has S slots, wherein NS is the number of new message slots in the upstream data message, wherein ES is the number of expansion slots in the upstream data message, wherein the upstream data message has DS data slots, and wherein S=NS+ES+DS.

21. The method of claim 16 wherein an upstream data message has S slots, wherein NS is the number of new message slots in the upstream data message, wherein ES is the number of expansion slots in the upstream data message, wherein CS=NS+ES, wherein:
  if DS<DQ<αDS, $$CS = M = \frac{S}{\frac{k}{e}+1}$$

wherein DQ is the number of reservation requests waiting to be processed in a reservation request queue, wherein α is a constant, wherein M is the number of CS in steady state, and wherein k is the average number of data slots reserved by reservation requests;
  if DQ<DS, $$CS=S-DQ;$$

and, if DQ>αDS, $$CS = M - \frac{DQ - \alpha DS}{6}.$$

22. The method of claim 16 wherein the expansion slots are slots which are expanded from contention slots according to a fixed search tree expansion procedure.

23. A station for transmitting and receiving data over a communication medium comprising:
   a) slot expanding means for expanding slots, which are in a data message received by the station and which experienced collisions, to expansion slots according to a search tree expansion procedure;
   b) slot parameter determining means for determining a slot parameter defining a future upstream data message, wherein the slot parameter indicates (i) new message slots within which new reservation requests may be transmitted to the station, and (ii) the expansion slots;
   c) range parameter determining means for determining a range parameter R useful in determining whether new reservation requests may be transmitted to the station; and,
   d) inserting means for inserting the slot parameter and the range parameter R in a downstream data message for communication over the communication medium.

24. The station of claim 23 wherein an upstream data message has S slots, wherein an upstream data message has DS data slots, wherein an upstream data frame has ES expansion slots, and wherein an upstream data frame has NS new message slots.

25. The station of claim 24 wherein:
   if DS<DQ<αDS, $$CS = M = \frac{S}{\frac{k}{e}+1}$$

wherein CS=NS+ES, wherein S=CS+DS, wherein DQ is the number of reservation requests waiting to be processed in a reservation request queue, wherein α is a constant, wherein M is the number of CS in steady state, and wherein k is the average number of data slots reserved by reservation requests;
   if DQ<DS, $$CS=S-DQ;$$

and,
   if DQ>αDS, $$CS = M - \frac{DQ - \alpha DS}{6}.$$

26. The station of claim 23 wherein the slot expanding means expands slots, which are in a data message received by the station and which experienced collisions, to expansion slots ES according to a fixed search tree expansion procedure.

27. The station of claim 23 wherein the range parameter determining means determines the range parameter R according to the following equation:

$$R(n+1) = \max\left\{\min\left\{N, R(n) - NS(n) + \frac{e-1}{e-2}COL(n) + \frac{NS(n)}{e}\right\}, NS(n+1)\right\},$$

where n indicates a current frame just received by the station, n+1 indicates a next upstream data frame to be received by the station, R(n+1) is a range parameter for the next upstream data frame n+1, R(n) is a range parameter for the upstream data frame n just received, N represents a number of active other stations, NS(n+1) is a number of new message slots in the next upstream data frame n+1, NS(n) is a number of new message slots in the upstream data frame n just received, COL(n) is a parameter COL based upon the upstream data frame n just received, and e is 2.718281828 . . . .

28. The station of claim 27 wherein the number of active stations is determined by the following equation:

$$SUC = NS\frac{N}{NS-1}\left(\frac{NS-1}{NS}\right)^N$$

wherein N is the number of active stations, wherein NS is a total number of new message slots in the upstream data frame n just received, and wherein SUC is a number of new message slots in the upstream data frame n just received which include data but in which collisions did not occur.

29. The station of claim 27 wherein the number of active stations is determined from a lookup table generally corresponding to the following equation:

$$SUC = NS\frac{N}{NS-1}\left(\frac{NS-1}{NS}\right)^N$$

wherein N is the number of active stations, wherein NS is a total number of new message slots in the upstream data frame n just received, and wherein SUC is a number of new message slots in the upstream data frame n just received which include data but in which collisions did not occur.

30. The station of claim 27 wherein the number of active stations is determined by the following equation:

$$COL = NS - NS\frac{N}{NS-1}\left(\frac{NS-1}{N}\right)^N - NS\left(\frac{NS-1}{NS}\right)^N$$

wherein N is the number of active stations, wherein NS is a total number of new message slots in the upstream data frame n just received, and wherein COL is a number of new message slots which are in the upstream data frame n just received and in which collisions occurred.

31. The station of claim 29 wherein the number of active stations is determined from a lookup table generally corresponding to the following equation:

$$COL = NS - NS\frac{N}{NS-1}\left(\frac{NS-1}{N}\right)^N - NS\left(\frac{NS-1}{NS}\right)^N$$

wherein N is the number of active stations, wherein NS is a total number of new message slots in the upstream data frame n just received, and wherein COL is a number of new message slots which are in the upstream data frame n just received and in which collisions occurred.

32. The station of claim 23 wherein the expansion slots are slots which are expanded from contention slots according to a fixed search tree expansion procedure.

33. A station comprising:

a receiver arranged to receive first and second downstream messages, wherein the first downstream message defines a first upstream message having new message slots, expansion slots, and data slots, and wherein the second downstream message defines a second upstream message having new message slots and an address determining whether the station may transmit a reservation request in one of the new message slots of the second upstream message; and, a transmitter, wherein the transmitter, in response to the first downstream message, transmits a reservation request in a new message slot of the first upstream message if the station determines to do so, re-transmits a reservation request in an expansion slot of the first upstream message if the station had transmitted a reservation request in a slot which was in a previous upstream message and which was expanded in the first upstream message, and transmits data in a data slot, if any, reserved to the station and wherein the transmitter, in response to the second downstream message, transmits a reservation request in a new message slot of the second upstream message if the address in the second downstream message corresponds to an address of the station.

34. The station of claim 33 wherein the station is a subset of all stations receiving an address in the second upstream message.

35. The station of claim 33 wherein the address in the second upstream message is a group address.

36. The station of claim 35 wherein the station is a subset of all stations receiving the group address in the second upstream message.

37. The station of claim 33 wherein the expansion slots are slots which are expanded from contention slots according to a fixed search tree expansion procedure.

38. A station comprising:

a receiver arranged to receive a downstream data frame having a contention range parameter R, wherein the contention range parameter R has one of at least two possible priority values;

a transmission parameter generator arranged to generate a transmission parameter RN depending upon the priority of data to be transmitted by the station, wherein the transmission parameter RN is constrained by the contention range parameter R; and, a transmitter arranged to transmit a reservation request in a slot of a next upstream data frame if the transmission parameter RN corresponds to the slot in the next upstream data frame and if the reservation request relates to data corresponding to the transmission parameter RN.

39. The station of claim 38 wherein:

the receiver receives a downstream data frame having a first contention range parameter $R_H$ and a second contention range parameter $R_L$, wherein the first contention range parameter $R_H$ is a high priority value, and wherein the second contention range parameter $R_L$ is a low priority value;

the transmission parameter generator generates a first transmission parameter $RN_H$ if the station has high priority data to transmit and generates a second transmission parameter $RN_L$ if the station has low priority data to transmit, wherein the first transmission parameter $RN_H$ is constrained by the first contention range parameter $R_H$ and wherein the second transmission parameter $RN_L$ is constrained by the second contention range parameter $R_L$; and, the transmitter transmits a first reservation request in a slot of a next upstream data frame if the first transmission parameter $RN_H$ corresponds to the slot in the next upstream data frame and if the first reservation request relates to high priority data, and transmits a second reservation request in a slot of a next upstream data frame if the second transmission parameter $RN_L$ corresponds to the slot in the next upstream data frame and if the second reservation request relates to low priority data.

40. The station of claim 1 wherein the transmitter re-transmits a reservation request in an expansion minislot expanded from a minislot in which the transmitter had previously transmitted the re-transmitted reservation request.

41. The station of claim 9 wherein the selected expansion slot is expanded from a slot into which the inserter had previously inserted the previously transmitted reservation request.

42. The method of claim 16 wherein the selected expansion slot is expanded from a slot into which the previously transmitted reservation request had been previously inserted.

* * * * *